United States Patent [19]

Dewey et al.

[11] Patent Number: 4,577,926
[45] Date of Patent: Mar. 25, 1986

[54] FIBER OPTIC WRITING HEAD

[75] Inventors: Anthony G. Dewey; Charles P. Marinelli, both of San Jose, Calif.

[73] Assignee: International Business Machines Corporation, Armonk, N.Y.

[21] Appl. No.: 537,478

[22] Filed: Sep. 30, 1983

[51] Int. Cl.[4] .............................................. G02B 6/04
[52] U.S. Cl. ...................................... 350/96.25; 355/1
[58] Field of Search ............... 350/96.24, 96.25, 96.27, 350/96.10; 355/1

[56] References Cited

U.S. PATENT DOCUMENTS

| 3,666,347 | 5/1972 | Kitano et al. | 350/96 B |
| 3,936,841 | 2/1976 | Tiefenthal | 354/10 |
| 4,079,404 | 3/1978 | Comerford et al. | 357/19 |
| 4,331,380 | 5/1982 | Rees et al. | 350/96.25 |
| 4,373,780 | 2/1983 | Lama | 350/96.25 |

FOREIGN PATENT DOCUMENTS 2073905 10/1981 United Kingdom ............. 350/96.25

OTHER PUBLICATIONS

Veinberg et al., "Correction of Curvature in Images Produced by ...," *Soviet J. Opt. Tech.*, vol. 34, No. 4, Aug. 1967, pp. 424–427.

Dewey et al., "The Application of GaAlAs Lasers to ...," *IBM J. Res. Develop.*, vol. 26, No. 2, Mar. 1982, pp. 177–185.

*Primary Examiner*—John Lee
*Attorney, Agent, or Firm*—Joseph E. Kieninger; Joseph G. Walsh

[57] ABSTRACT

A fiber optic writing head delivers light from the ends of a close-packed array of optical fibers through a small inexpensive lens which images the light onto the writing surface. The ends of the individual fibers in the array are fixed at various angular positions to form a surface that is the image of the writing surface through the lens. The ends of the fibers are spaced along the surface so that the image that is produced on the writing surface has uniform spacing. The angular positions of the fibers are chosen such that the axis of the refracted beam emitted by each fiber is directed at the center of the entrance pupil of the lens.

9 Claims, 4 Drawing Figures

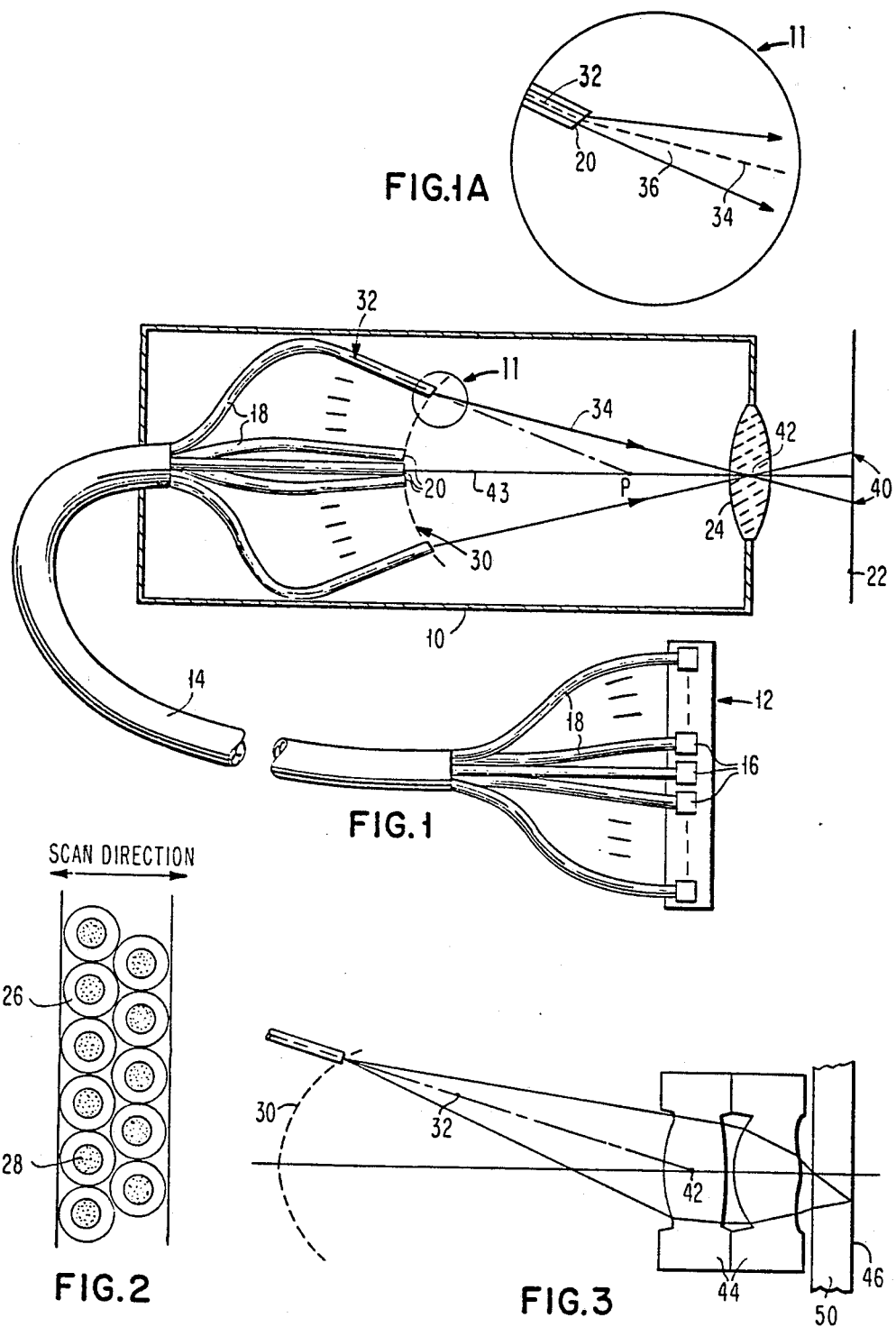

FIBER OPTIC WRITING HEAD

TECHNICAL FIELD

This invention relates to optical systems and more particularly to a fiber optic writing head for writing on a surface with an array of laser beams.

BACKGROUND ART

Printing and display systems that employ a scanned laser beam or beams, to write on a surface are well known. In some systems it is advantageous to use a number of GaAs semiconductor lasers. It is difficult to deliver the power from these lasers in a uniform, close-packed array of beams.

One solution to this problem is to couple the laser power into optical fibers, form a close-packed array with the ends of the fibers and image this array onto the writing surface. This approach was described by Dewey and Crow in the IBM Journal of Research and Development, Vol. 26, No. 2, March 1982. This article describes the use of a parallel array of eight fibers with the end of the fiber array polished flat. A means of coupling the power from an array of GaAs lasers into an array of optical fibers is described by Comerford, U.S. Pat. No. 4,079,404.

In the article by Dewey and Crow (Op. Cit) the writing head comprises the fiber array and a small imaging lens. This head is translated across the surface of a liquid crystal cell by a scanning mechanism and the laser power is coupled to the head through the flexible fiber-optic cable. The head must produce an array of beams on the writing surface that has uniform focus and intensity, and is not distorted. Moreover, the mass of the writing head should be minimized and hence the lens should be small and simple. A simple lens, having one or two elements, has imperfections that make these requirements more difficult to achieve as the number of elements in the fiber array is increased. These imperfections include field-curvature, causing non-uniform focus for a straight parallel array; distortion, and non-uniform collection of light from the fibers.

The patent to Tiefenthal U.S. Pat. No. 3,936,841 describes a photocomposing system in which a fiber-optic face plate is used as a field flattening element. The fibers in the face plate are either parallel, or in an angled arrangement or a combination of both arrangements. No mention or use is made of the refraction of the light beams at the surface of the fibers.

The patent to Kitano et al, U.S. Pat. No. 3,666,347 describes the use of a bundle of optical fibers as a field-flattener for a spherical lens. The ends of all fibers are perpendicular to both the lens and to the flat field.

None of these references teaches or suggests an angled array of optical fibers having the surface polished to a curved shape which delivers an array of beams that are refracted at the surface of the fibers and converge at the entrance pupil of an imaging lens.

SUMMARY OF THE INVENTION

It is a primary object of this invention to provide an improved fiber-optic writing head for delivering to a surface an array of writing beams that are uniform in focus and in intensity, and are uniformly spaced.

It is another object of this invention to provide a fiber-optic writing head that produces a close-packed array of writing beams.

It is still another object of this invention to provide a fiber-optic writing head that is light-weight and may be scanned across the writing surface.

These and other objects are accomplished by a laser optical system comprising a flexible bundle of optical fibers for delivering the power from an array of light sources to a writing head and a small inexpensive lens for imaging the light emitted from the ends of the optical fibers onto the writing surface. In the writing head the ends of the optical fibers are arranged in a close-packed array and the lens forms an image of this array on the writing surface that is uniform in focus and in intensity. The individual fibers in the array are fixed at various angular positions, and the end of the array is ground and polished to the shape of a surface that is the image of the writing surface through the lens. The angular positions of the fibers are chosen such that the axis of the refracted beam emitted by each fiber is directed at the center of the entrance pupil of the lens.

Other objects of this invention will be apparent from the following detailed description, reference being made to the following drawing in which a specific embodiment of the invention is shown.

BRIEF DESCRIPTION OF THE DRAWINGS

FIG. 1 is a schematic view of the fiber optic writing head in accordance with this invention;

FIG. 1A is an enlarged view of the region 11 in FIG. 1;

FIG. 2 illustrates a close-packed two-column fiber array;

FIG. 3 is a two-element lens for use in the writing head of FIG. 1.

DESCRIPTION OF THE PREFERRED EMBODIMENT

The laser optical system shown in FIG. 1 comprises a writing head 10 which is connected to an array of GaAs lasers 12 by a fiber-optic cable 14. The power from the individual lasers 16 is coupled into optical fibers 18 and delivered by the cable 14 to the writing head 10. In the head 10 the laser power is emitted by the ends 20 of the optical fibers 18 and is imaged onto a surface 22 by lens 24.

FIG. 2 illustrates a close-packed, two-column array of optical fibers 18. The diameter of the fiber cladding 26 is approximately twice that of the core 28. Thus, when the writing head is scanned in the direction shown, it produces an array of focused beams that is effectively close-packed. The offset in the two columns is compensated by the electronics of the printing or display system.

In FIG. 1 surface 30 represents the field curvature of lens 24. That is, it is the locus of points that are in focus on the surface 22 or, in other words, it is the image of surface 22 as produced by lens 24. It is evident that by cleaving or polishing the end 20 of each fiber perpendicular to its axis 32, and positioning the ends of the fiber array along surface 30 with the axes 32 of the fibers directed at the center 42 of the entrance pupil of the writing lens, that an image 40 of the fiber array would be produced on the surface 22 which is uniform in focus and intensity. This procedure is, however, impractical as it is necessary to grind and polish the surface of the fiber array to the shape of the surface 30 after the fibers have been cemented in position.

The radius of curvature of surface 30 is, in general, much shorter than the distance of the lens 24 from the surface 30. Thus, the process of polishing the array of fibers to the shape of surface 30 will cause the ends 20 of the fibers to be oblique to their axes 32 as shown in FIG. 1A. The cone of light 36 emitted by the fiber is refracted at the end 20 of the fiber.

According to this invention each fiber 18 is fixed in position such that its axis 32 is directed at a calculated point P on the axis of the lens 24. Point P is determined such that subsequent to grinding and polishing the surface of the array to the shape of surface 30, the axis 34 as shown in FIG. 1A, of the refracted beam 36 emitted by the fiber is directed at the center 42 of the entrance pupil of lens 24.

The distance of each fiber end 20 from the axis 43 of lens 24 may be chosen to compensate for the distortion of the lens. That is, the image 40 of the fiber array may be such that the array of focused beams is uniformly spaced.

While the lens 24 is shown schematically as a single-element lens, it is to be understood that a multi-element lens such as the two-element plastic lens 44 shown in FIG. 3, may also be used. This lens is small, light-weight and inexpensive compared with the multi-element lens that would be necessary to create a uniform image from a flat-faced, parallel array of fibers.

As an example of this invention, FIG. 3 illustrates a two-element plastic lens 44 that has a focal length of 4.8mm, an aperture of 6.4mm and is designed to produce a 1:4 reduced image of a fiber array on the back surface 46 of a glass plate 50. The fibers used in this system have a diameter of 100 $\mu$. When used with a flat-faced, parallel array of fibers it was found that the lens 44 could form an acceptable image on the surface 46 with up to 32 fibers in a double column arrangement. In this arrangement the extreme fibers in the array are displaced 0.8mm from the axis of the lens.

In a second embodiment a single fiber was positioned at points along the surface 30 with its axis 32 directed at the center 42 of the entrance pupil of lens 44. It was found that the fiber could be displaced up to 4mm from the axis of the lens and still create an acceptable image on surface 46. This shows that a fiber-optic writing head constructed according to the principles of this invention could use the lens 44 to image up to 160 fibers onto surface 46. This is an improvement of a factor of five over a parallel array.

While the surface 22 in FIG. 1 is depicted as a flat surface, a fiber-optic writing head may also be designed according to the principles of this invention to write on a curved surface. This curved surface may be, for example, the cylindrical surface of the photoconductor drum of a laser printer. In addition, the fiber-optic cable 14 is shown in FIG. 1 to be coupled to an array 12 of GaAs lasers. Other sources of light could also be coupled into the optical fibers 18 and delivered to the writing head 10.

Although preferred embodiments have been described, it is understood that numerous variations may be made in accordance with the principles of this invention.

We claim:

1. A fiber optic writing head for imaging an array of beams emitted by optical fibers onto a writing surface, said writing head comprising
    a lens having an entrance pupil with a center,
    an array of optical fibers having ends which are imaged by said lens onto the writing surface, said ends are positioned along a curved first surface which is the image of the writing surface as produced by said lens, said fibers being positioned at predetermined angles so that the axis of the refracted beam being emitted at each of said ends is directed at said center of said entrance pupil of said lens wherein the image on said writing surface has a constant focus and intensity.

2. A fiber optic writing head as described in claim 1 wherein said ends are spaced so as to produce an image on said writing surface that has uniform spacing.

3. A fiber optic writing head as described in claim 1 wherein said first surface is the image of a plane writing surface.

4. A fiber optic writing head as described in claim 1 wherein said first surface is the image of a curved writing surface.

5. A fiber optic writing head as described in claim 1 wherein said ends are arranged in a close-packed two-column array.

6. A fiber optic writing head as described in claim 1 wherein said lens is a single-element lens.

7. A fiber optic writing head as described in claim 1 wherein said lens is a multi-element lens.

8. An optical system for imaging an array of beams onto a writing surface comprising
    a plurality of lasers,
    a lens having an entrance pupil with a center,
    an array of optical fibers into which the light from said lasers is coupled, said fibers having ends which are imaged by said lens onto the writing surface, said ends are positioned along a curved first surface which is the image of the writing surface as produced by said lens, said fibers being positioned at predetermined angles so that the axis of the refracted beam being emitted at each of said ends is directed at the center of said entrance pupil of said lens wherein the image on said writing surface has a constant focus and intensity.

9. An optical system as described in claim 8 wherein said lasers are GaAs lasers.

* * * * *